United States Patent [19]

Dunn

[11] Patent Number: 4,528,874
[45] Date of Patent: Jul. 16, 1985

[54] SCREW FASTENERS AND DRIVERS

[76] Inventor: J. Malcolm Dunn, 305 Via Montego, San Clemente, Calif. 92672

[21] Appl. No.: 458,333

[22] Filed: Jan. 17, 1983

[51] Int. Cl.³ .............................................. B25B 23/02
[52] U.S. Cl. ................................... 81/57.37; 81/436; 81/452; 81/461; 411/410
[58] Field of Search .............. 81/436, 461, 452, 454, 81/458, 57.37; 411/407, 410

[56] References Cited

U.S. PATENT DOCUMENTS

| 622,476 | 4/1899 | Hubbell | 81/57.37 |
| 1,779,339 | 10/1930 | Sokoloff | 81/452 |
| 1,797,390 | 3/1931 | Wood | 81/436 |
| 3,175,593 | 3/1965 | Launay | 81/436 |
| 3,891,017 | 6/1975 | Iskra | 81/436 |

FOREIGN PATENT DOCUMENTS

| 1078229 | 5/1980 | Canada | 81/436 |
| 1260280 | 2/1968 | Fed. Rep. of Germany | 81/57.37 |
| 766 | of 1914 | United Kingdom | 81/436 |
| 513497 | 10/1939 | United Kingdom | 81/436 |

Primary Examiner—James L. Jones, Jr.
Attorney, Agent, or Firm—Grover A. Frater

[57] ABSTRACT

An improved arrangement for driving threaded screw fasteners both manually and automatically utilizes mating conformations in the fastener head and driver including a central, preferably conical, depression in the head and a complementally shaped central projection extending from the driving tool. Further, the head is formed with slots, less deep than the depression, which open both at the depression and at the outer margins of the head. The driver is formed with corresponding blade sections.

The central projection and depression are formed such that force along axis of the driver toward the head and rotational force about the driver axis tend to force the fastener axis to alignment with the driver axis.

9 Claims, 13 Drawing Figures

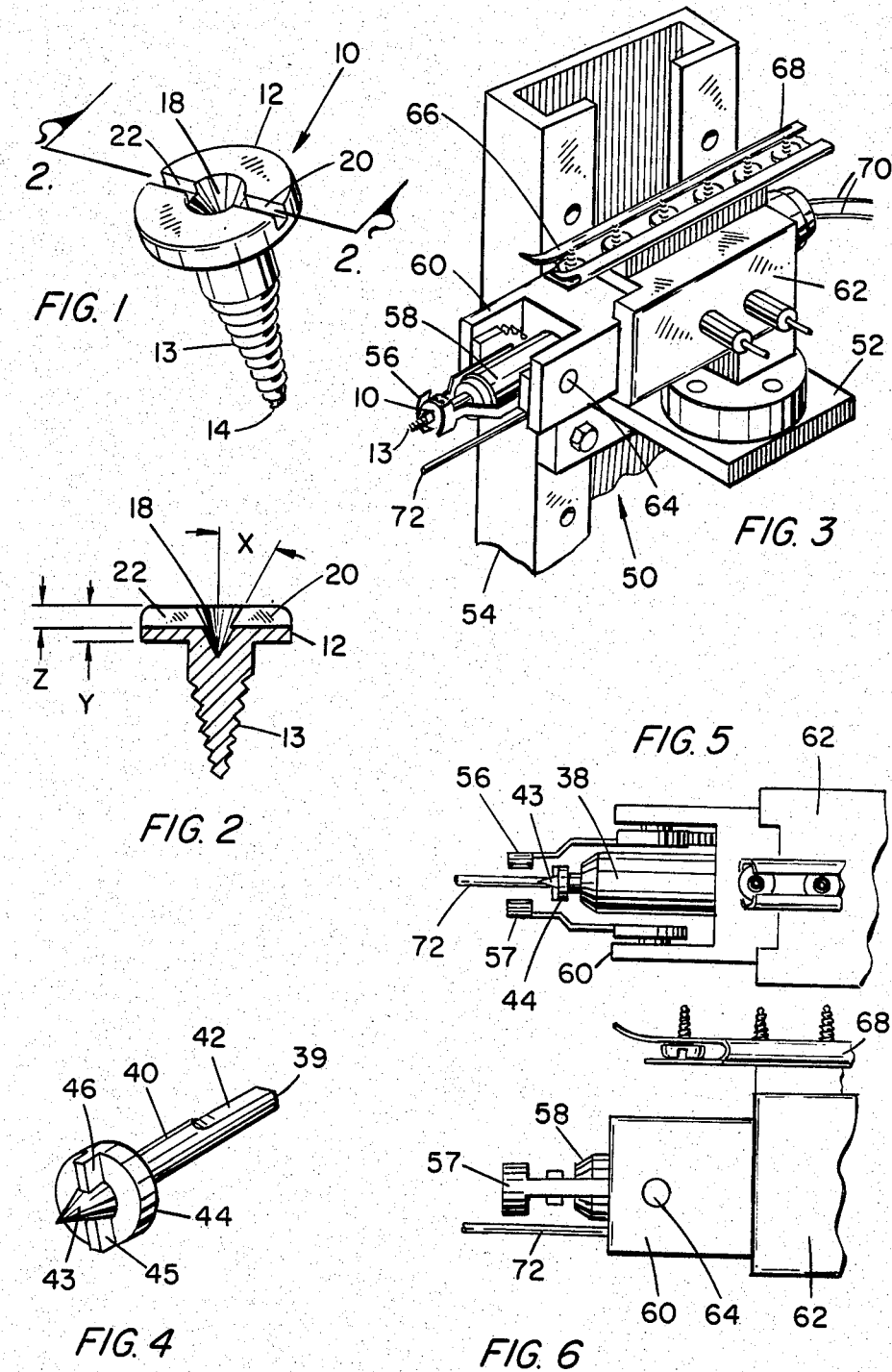

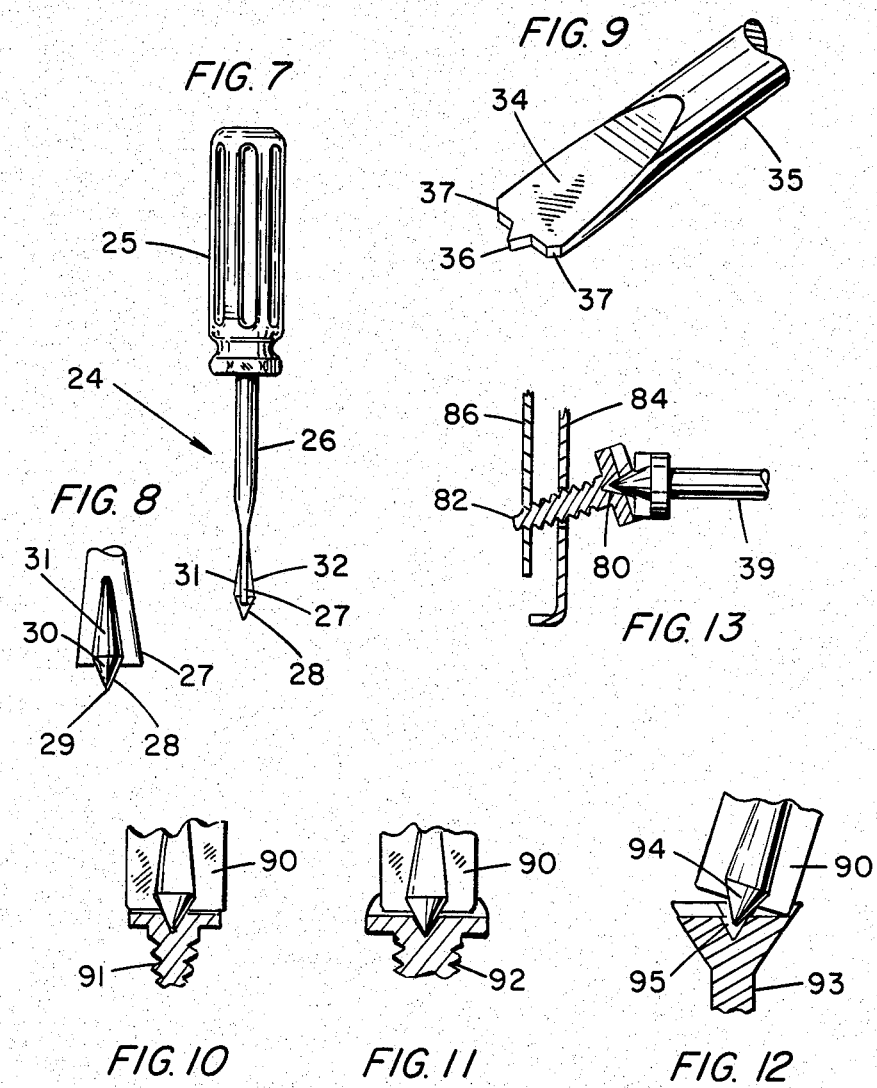

SCREW FASTENERS AND DRIVERS

TECHNICAL FIELD

This invention relates to improvements in fastening systems and in particular to screw type fasteners and drivers therefor.

BACKGROUND ART

In general, screw type fasteners are unitary devices formed with a head at one end of an elongated shaft. The shaft is threaded over all or a portion of its length. One form has its shaft tapered to smaller diameter in the direction away from the head at least in the region of its distal end. The other form has a threaded shaft of uniform diameter.

Screw type fasteners are used to secure one element to another. Ordinarily, the shaft of the fastener extends freely through a hole in one element, whereas the threads of the shaft engage the material of the second element. Rotation of the fastener screws its threads into the second element until further rotation is prevented upon abutment of the fastener head against the surface of the first element. The tapered fastener is used when the material of the second element is relatively soft. In that case, an unthreaded pilot hole may be formed in the second member. The fastener enters the pilot hole and is driven along it. As the fastener is turned, the material of the second element is deformed to the shape of mating threads. Such a fastener is called a wood screw and is used for fastening element to wood and to readily deformable plastics.

Screw fasteners intended for securing things to metal usually have straight cylindrical, threaded shafts. The metal, the second element or nut, into which the fastener is to be turned is formed with an internally threaded hole to receive the threads of the fastener. When the head is formed with a kerf or a slot to receive a twisting tool, such as a screw driver or nut driver or an Allen wrench, the fastener is called a machine screw. Larger sizes of such fasteners are arranged to be twisted by a wrench and are called bolts.

A variation of the tapered shaft, threaded fastener called a sheet metal screw, is formed with deep thread grooves, often pitched at about the thickness of two metal sheets. Designed for use in holding two sheet metal pieces together, the sheet metal screw is inserted through a hole larger than the shaft in one sheet metal element into a smaller hole in a second sheet metal element. The holes are sized, relative to the screw shank diameter and thread pitch such that the screw cams the two sheets together with or without an upsetting of the periphery of the hole in the second member.

There are many variations in the form and in the manner in which such screw fasteners are used. In one of the most important of these variations, no pilot hole, or only a small pilot hole, is formed. Sheet metal screws especially are made in that form and are called "self tapping."

The installation and removal of these threaded fasteners is accomplished by rotating them about the axis of the shaft with a screw driver or nut driver or, in one special case, an Allen wrench. In each case, the screw fastener and its installation and removal tool are formed with complementary conformations which permit application of torque to the fastener. Four forms of interfitting conformations are common. Most common is the kerf, a slot formed diametrically across the outer face of the fastener's head, which is driven by a blade which ideally is almost as wide as the kerf is long. Next most common is the Phillip's conformation. The driver has a conical end the side wall of which is grooved along its length at four regions equally spaced around its circumference. A depression having the inverse of that shape is formed in the head of the screw fastener.

Cap screws and set screws are found in machinery and in metal working tooling. They are often formed with a straight walled hexagonal depression in the head which accommodates an Allen wrench. The fourth form employs the hexagonal head of bolts. It is normally driven with a nut driver, a tool with a hexgonally shaped depression in its working end.

The three primary considerations in selecting head form are cost of the fastener, the physical qualities of the substance into which the fastener is to be driven, and convenience and cost considerations involved in selection and use of the driving tool.

Maximum leverage for turning the fastener is available when its head has hexagonal form. However, the fact that the hexagonal head (1) cannot be recessed, (2) is aesthetically less pleasing than other head forms, and (3) requires a driving tool that closely matches the head in size, accounts for limited use except in the interior and hidden regions of mass produced products.

The hexagonal head presents another serious problem. The driver must be aligned rather exactly with the head before the driver and head can be mated. That problem is overcome in some degree in the Phillips configuration. A small degree of lateral and axial misalignment does not prevent mating of the driver and head. It is as acceptable, or even more so, than the kerfed head, and for those reasons is widely used in commercial products.

But the Phillips configuration is not widely used in applications where the fastener might be removed in affecting repairs and the like. Because the bearing surfaces against which the driver must act are close to the axis of the head, mechanical advantage is small and large force is required to affect rotation. The conformations are easily damaged unless the driver and head are closely aligned and the driver size closely matches the head cavity.

Mechanical purchase almost equal to that of the hexagonal head is available in the kerfed head and blade combination, when the width of the driver approaches the length of the kerf. An advantage is that the size of the driver and kerf need not be closely matched. However, the driver must be aligned rotationally, axially, and laterally to enable proper mating of driver blade and kerf. Consequently, the kerfed head, while most popular and practical for small volume tasks and where ease of removal is important, is generally unsuited for mass production use.

DISCLOSURE OF INVENTION

It is an object of the invention to provide an improved screw type fastener and driver system.

It is an object to provide an interfitting conformation arrangement for a fastener and driver pair which permits mating of the fastener and driver despite initial misalignment in substantial degree. In that connection, the invention permits mating despite substantial initial axial and transverse and rotation misalignment.

A further object is to achieve easier mating without sacrificing the mechanical advantage that can be achieved in the kerf and blade driver combination. A related object is to provide fasteners whose driving conformation will interfit with a straight blade type screw driver as well as with the driver of the invention without sacrificing mechanical advantage.

A still further object is to provide a conformation form for a fastener and driver which permits driving a fastener in either direction with a driver whose size is not matched to the size of the fastener conformation.

The invention provides a head driven fastener which is more easily directed, set and driven by robotic drivers than are prior head driven fasteners. The driving conformation of the invention can readily be driven by robotic and hand-held power drivers despite relatively poor definition in the head conformation surface contours. The result is that lower quality and less expensively produced fasteners may be employed without sacrificing the ease and facility with which they may be installed.

Screw fasteners which incorporate the invention can be removed and, indeed, installed or reinstalled using a conventional straight blade driver. Thus, the cost advantage of the invention to manufacturers of mass produced products is not achieved at the expense of increased cost or inconvenience to the purchaser-user or repairman who may eventually need to remove or replace fasteners which incorporate the invention.

In currently practical terms, fasteners according to the invention are no more expensive and are more easily handled and driven in automatic and semi-automatic production than is the Phillips head fastener, and they can be removed far more easily than the Phillips head fastener. They can be removed as readily as a kerfed fastener with a conventional blade driver, and can be removed with even greater facility with a driver formed according to the invention.

These objects and advantages, and others, which will become apparent upon an examination of the accompanying drawings and their description are realized in part by the provision of a fastener whose head is formed with a central depression and a diametrically formed kerf. The depression is made wider and deeper than the kerf. A head so formed may be driven by an ordinary straight bladed screw driver because the driving force of such a blade is applied to the head at the edges across the width of the driver. It is applied to the walls of the kerf at the ends of the kerf beyond the central depression.

A driver according to the invention has the form of a straight bladed driver to which a forwardly extending projection has been added in the midregion of its width.

In preferred form, the shape of the projection of the driver is the inverse in size and shape of the depression in the head, but that is not essential. In preferred form, the depression is conical. It is also preferred that the depression extend to about two to two and one-half times the depth of the kerf and that the side walls of the conical depression form an angle of between 35 degrees and 40 degrees with the central axis of the fastener. Such a depression permits location by the projection of the driver despite axial displacement of many degrees and despite transverse displacement several times the width of the kerf. It ensures that axial orientation of the fastener will match and be controlled by that of the driver, even when the blade is being rotated in searching for mating relation with the kerf.

BRIEF DESCRIPTION OF THE DRAWINGS

In the drawings:

FIG. 1 is an isometric view of a screw type fastener which embodies the invention;

FIG. 2 is a cross-sectional view taken on line 2—2 of FIG. 1;

FIG. 3 is an isometric view of a portion of a robotic screw driver unit;

FIG. 4 is an isometric view of the driver element of the robot;

FIG. 5 is a top view of a portion of the driver head of the robot;

FIG. 6 is a side view of a portion of the driver head of the robot;

FIG. 7 is a view in side elevation of a manual screw driver the driver end of which is configured according to the invention;

FIG. 8 is an isometric view of a modified form of the driver end of a screw driver according to the invention;

FIG. 9 is an isometric view of a modified form of the driver end of a screw driver according to the invention;

FIGS. 10 and 11 are fragmentary illustrations, partly in section, showing how the driving end of a screw driver and the head conformation of a screw type fastener, both embodying the invention, interfit when the driver is oversized for the fastener in FIG. 10 and undersized for the fastener in FIG. 11;

FIG. 12 is a fragmentary section of a screw driver and screw fastener, the latter in section, illustrating that the driver and fastener can be associated notwithstanding that they are axially misaligned in substantial degree; and FIG. 13 is a schematic showing in which some elements are shown in section and some in elevation, illustrating the interaction between the driver of the robot, the screw fastener, and the elements to be fastened when the latter are misaligned.

DESCRIPTION OF THE PREFERRED EMBODIMENT

The screw fastener 10, shown in FIGS. 1 and 2, is the type ordinarily called a sheet metal screw. It is the head rather than the threaded shaft of the fastener that is of primary interest in the invention. More particularly, it is the conformation in the head into which the driving instrument fits that is of interest.

The fastener 10 has a head 12 and a screw threaded shaft 13. In this case the shaft is tapered to a point 14 at the end of the shaft away from the head. A recess is formed in the head which is symmetrical about the central vertical axis of the fastener. The recess has been designated 18. The recess is defined by its outer wall, and the same numeral 18 is intended to designate that wall for the sake of clarity.

The conformation in the head includes a kerf, or slot, which extends diametrically across the face of the head and is divided by recess 18 into two portions. The portion at the right is designated 20, and the portion at the left is designated 22. Again, for clarity, the numerals 20 and 22 are employed not only to indicate the kerf, but also the walls that form the kerf.

In preferred form, the recess 18 is conical in shape whereas the kerf is a slot with parallel side walls which are parallel to the central axis of the fastener and extend to a bottom wall which is perpendicular to the side walls. The central conical recess, and the kerf, are formed according to existing techniques for the production of screw fasteners, i.e. they may be hammered into shape simultaneously by formation of the head, or they may be machined using conventional drilling and milling procedures. One of the advantages of the invention is that those alternative production techniques are available.

Driving force is applied to the fastener by a driver blade in the same way that a straight bladed screw driver applies turning force to a screw fastener that is provided only with a kerf. The central recess cooperates with a triangular extension at the center region of a straight bladed driver to assist in locating the driver properly within the kerf and, in certain circumstances, to force orientation of the fastener into alignment with the rotational axis of the driver.

The preferred hand driver is illustrated in FIGS. 7 and 8. The whole driver is designated 24 in FIG. 7. It comprises a handle 25, a shank 26, a driver blade 27, and a conical extension 28. The driving end of the driver is shown rotated by ninety degrees in FIG. 8. It can be seen there that the conical extension 28 extends from the apex 29 below the lower end of blade 27 to a base 30 above the lower end of the blade 27. Above the lower end of the blade 27, extensions of the projection 28 lie on each side of the blade 27. One of them is numbered 31 and the other is numbered 32, and together with the portion of the blade 27 between them define what appears to be a cylindrical shaft for which the projection 28 is a conical point. That shape is preferred for a hand operated screw driver, but other shapes are possible. One of them is shown in FIG. 9 where the blade 34 at the end of shank 35 has its extreme end formed with a central extension 36 which is triangular in shape because it is no thicker than the end of the blade 34 itself. The corners of the blade end are tapered inwardly at 37 so that they will not extend outside the slots of flat-headed fasteners such as the fastener of FIG. 12.

Another form of driver is illustrated in FIG. 4. This one is arranged for powered operation by a power driver such as the robot head shown in FIG. 3. In FIG. 4, the driver is formed by a shaft 40 having a flat 42 formed at one end to facilitate its being rotationally driven by an air motor in the robot head. At the other end, the shaft terminates in a conical extension 43 in back of which the shaft has enlarged diameter to form a disc shaped portion 44 which is adapted to abut against the face of the screw fastener head when the rectangular blade sections 45 and 46 are engaged in the kerf of a fastener head. The two blade sections 45 and 46 are diametrically arranged, and the combination of those two blade sections and the extension 43 have shape to fit within the recess 18 and the kerf sections 20 and 22 of the fasteners shown in FIGS. 1 and 2.

The driver of FIG. 4 is assembled into the robot head of FIG. 3. The head which is generally designated 50 is mounted on an L-shaped bracket 52 which, in turn, is mounted upon a C-shaped member 54 which serves as part of the robot frame. In FIG. 3 the fastener 10 is shown to be clamped within a pair of jaws one of which is designated 56 for identification, and which engage the opposite sides of the head 12 of the fastener and hold the fastener so that its threaded shaft 13 extends in a direction that is parallel to the direction of movement of a sleeve 58 and a driver holder yoke 60. Sleeve 58 is capable of reciprocal movement relative to the yoke 60, and the yoke 60 is capable of reciprocal movement relative to the head housing 62.

The head clamping structure pivots about an axis 64 from the position it is shown to occupy in FIG. 3, through an angle of ninety degrees, so that the clamp extends vertically in FIG. 3 to a position in which it can engage the next fastener 66 of a series of fasteners which advance along a feeder 68 during the course of operation of the robot.

In operation, the clamp engages a fastener from the feeding mechanism 68 and rotates it down to the position fastener 10 is shown to operate in FIG. 3. Upon a command which has the form of increased pressure at one of the pressure lines 70, the yoke 60 advances to insert the shaft 13 of the fastener into a position in one or both of a pair of elements that are to be fastened together. Completion of that step is detected by a sensing rod 72 which in this robot extends from the yoke 60 below the clamp and the sleeve 58. When an appropriate degree of insertion of the fastener is sensed by the rod 72, the sleeve 58 moves forward to engage the conformation 43, 44, 45 and 46 of the fastener driver with the complementary conformations formed in the head of fastener 10. That operation ordinarily involves rotation of the driver until the blades 45 and 46 are aligned with the kerf in fastener 10. Upon alignment, the driver moves forward to move elements 45 and 46 into the kerf sections 20 and 22 of the fastener 10. When that occurs, the sleeve 58 is moved forwardly to cam open the clamp elements. Compressed air made to flow through the air lines 70 force rotation of the driver so that the fastener 10 is threaded into position. In FIGS. 5 and 6, the numeral 57 designates the other of the two clamp elements.

In FIG. 13, the robot driver 39 of FIG. 4 is shown with its forward conformations partially engaged in the conformations of the head of a fastener 80. The shank 82 of the fastener extends through openings in two sheet metal elements. One, L-shaped, is numbered 84, and the other is numbered 86. The elements 84 and 86 represent sheet metal elements that are to be fastened together with the fastener 80. The fastener extends through the two elements the holes of which are misaligned so that the axis of the fastener 80 is not perpendicular to the surfaces of the sheet metal members 84 and 86, and is not perpendicular to the axes of the two holes through which the fastener is to be formed. It will be apparent that the application of force to the driver 39 will have the effect of forcing the fastener 80 through the openings in the two sheet metal members 84 and 86 and that the latter will be forced to movement one relative to the other, so that those two sheet metal elements are moved so that the axes of the holes through them are brought substantially into alignment with the rotational axis of the driver 39. Thus it is that the driver can drive the fastener, and accomplish the fastening operation, notwithstanding what is obviously a very significant misalignment of the axis of the fastener 80 with the axex of the hole in which it is to be turned. The driver is capable of forcing the sheet metal elements and the fastener into proper position because, once the blade extensions of the driver are engaged within the kerf of the head, and the projection of the driver engages some point on the wall of the recess, a force couple is formed by which the fastener is forced into near axial alignment with the driver. If necessary to accomplish that result, as it is in this example, the elements which are to be secured together by the fastener are forced into proper relative orientation.

The thickness of the blade is necessarily slightly less than the width of the kerf in the screw fastening element. Rotation of the blade, relative to the fastener, brings the surfaces of the blade into contact with the side walls of the kerf at the margins of the fastener head. No force is transmitted from the blade to the head in the midregion of the width of the blade so that the formation of the central recess in the head does not diminish the amount of torque that is applied to the fastener upon rotation of the driver. Thus it is that the driver has the same affect applying the rotational force to the fastener, and nothing is lost by inclusion of the recess.

Location of the projection of the blade into the recess of the head ensures that the working end of the blade is centered across the width of the kerf, or nearly so. That is illustrated in FIGS. 10, 11 and 12. FIGS. 10 and 11 include portions of round headed fasteners, shown in central vertical section; whereas FIG. 12 shows a flat headed fastener in vertical cross-section. The driving end 90 of the same blade is shown in all three of FIGS. 10, 11 and 12. FIG. 10 illustrates the condition when the driver is too large for the fastener which, in this case, is identified by the numeral 91. In FIG. 11, the driver is smaller than what could be accommodated by the fastener 92; and FIG. 12 illustrates the condition in which the driver blade has its axis out of alignment with the central axis of the fastener 93. FIGS. 10 and 11 illustrate that wide latitude is permitted in the selection of driver size relative to the size of the fastener. As in the case of conventional screw drivers and fasteners with simple kerf slots, the size of the slot and the width of the driver blade preclude mating of an excessively large driver with the kerf of a fastener.

FIG. 12 illustrates an important feature of the invention. It will be apparent by inspection that that the driver of 90 cannot be employed to apply rotational torque to the fastener efficiently, although some torque can be applied, notwithstanding a very substantial angular difference between the driver and fastener axes. An attempt to rotate the driver will have the effect of producing a cam action between the projection 94 of the driver against the conical surface 95 of the depression in the fastener.

The effect is to develop a force that tends to align those axes and, unless prevented by other forces, they will be brought into alignment. As they approach alignment, both halves of the blade will be seated in the slots of the head whereupon full rotational torque can be applied to the fastener. To accomplish that result, it is preferred that the angle which the side walls of the driver projection and the side walls of the fastener recess make with the rotational axes of those elements be between thirty-five and forty degrees. That is the angle marked "X" in FIG. 2. While the benefits of the invention are realized in part if the projection of the driver is formed as a truncated cone, it is preferred that the projection be substantially completely conical, except that it is preferred that it be rounded at the apex because of the possibility that a sharply pointed projection might cause injury to a user.

Returning to FIG. 2, it is desirable that the slots in the head have a depth at least half as great as the height of the head. That is, the ratio of dimension "Y" to dimension "Z" should not be less than two, and in preferred form is between 2 and 1.5. In the preferred form, the depth of the recess 18 in the fastener head should be at least twice the depth of the slots, and in preferred form that depth is about one-quarter of the length of the diameter across the head.

Although I have shown and described certain specific embodiments of my invention, I am fully aware that many modifications thereof are possible. My invention, therefore, is not to be restricted except insofar as is necessitated by the prior art.

I claim:

1. A fastening system for threading a fastener into a work piece comprising, in combination:

a threaded fastener having a threaded shaft and a head conformed at the side of the head away from the shaft by a central depression and slots extending radially from the depression and opening at the sides of the head;

a driver rotatable about an axis and formed with a projection at one end thereof to interfit with the central depression of said head and with a pair of rectangular blade elements capable of interfitting with respectively associated ones of said slots when the projection of the driver is disposed at least partially within said depression of the head; and further comprising holding means for releasibly holding said fastener such that the axis of its shaft and the depression of its head are substantially aligned with the rotational axis of said driver;

driver control means for moving said driver and head relative to one another in the direction of said axis and rotationally about said axis to affect mating of the projection and blades with the depression and slots of the head without releasing said fastener from said holding means; and means for preventing movement of said holding means with said fastener as an incident to rotation of the fastener and for forcing said fastener from said holder independently of engagement of said head, and independently of any engagement of said holder, with any work piece.

2. The invention defined in claim 1 which further comprises means for moving said fastener and said driver and said holding means together in the direction of the rotational axis of said driver.

3. The invention defined in claim 2 which further comprises means for detecting the presence of a work element within a predetermined distance of said driver.

4. The invention defined in claim 3 in which said central depression and said extension continue to a point.

5. The invention defined in claim 4 in which the depth of the depression is at least twice the depth of said slots and in which the walls of the depression are tapered at an angle of between thirty-five and forty degrees to the axis of the threaded shaft.

6. A fastening system for threading a fastener into a work piece comprising, in combination:

a threaded fastener having a threaded shaft and a head conformed at the side of the head away from the shaft by a central depression and slots extending radially from the depression and opening at the sides of the head;

a driver rotatable about an axis and formed with a projection at one end thereof to interfit with the central depression of said head and with a pair of rectangular blade elements capable of interfitting with respectively associated ones of said slots when the projection of the driver is disposed at least partially within said depression of the head; and said central depression and said projection being right conical in shape and the axis of the conical shape of the driver coinciding with the axis of rotation of the driver, and the axis of the conical shape of the depression coinciding with the axis of said threaded shaft; and the sides of said conical shapes forming an angle with their respective axes whose magnitude is between thirty-five and forty degrees.

7. The invention defined in claim 6 in which said depression and said projection continue to a point.

8. The invention defined in claim 7 in which the depth of the depression is approximately twice the depth of said slots.

9. For use with a driver having driving conformations to mate with the driver receiving conformations of its head, a threaded fastener having a threaded shaft and a head fixed to one end of the shaft, the head being formed with a central depression and slots extending radially from said central depression, said slots opening both at the depression and at the margins of said head;

said slots being aligned with a diameter of said head;

said depression being formed by walls tapered to smaller size in the direction of its depth;

said slots being formed with substantially parallel sides and a bottom wall which is perpendicular to the sides and to the axis of said shaft; and the depth of the depression being at least twice the depth of said slots and the walls of the depression being tapered at an angle of between thirty-five and forty degrees to the axis of the threaded shaft.

* * * * *